United States Patent [19]
Neff

[11] 3,979,615
[45] Sept. 7, 1976

[54] FIELD ASSEMBLY FOR ELECTRIC MOTORS

[75] Inventor: Nelson Edward Neff, Harrisburg, Pa.

[73] Assignee: AMP Incorporated, Harrisburg, Pa.

[22] Filed: Feb. 5, 1975

[21] Appl. No.: 547,322

[52] U.S. Cl................................. 310/71; 336/192; 339/95 D
[51] Int. Cl.² ........................................ H02K 11/00
[58] Field of Search ................ 310/71, 194, 91, 42, 310/254, 258, 259, 260, 214, 217, 218, 216, 66, 42; 336/192, 107; 339/95 D, 221, 30, 276, 276 C, 276 T, 278; 174/84, 94

[56] References Cited
UNITED STATES PATENTS

| | | | |
|---|---|---|---|
| 3,226,585 | 12/1965 | Roe | 310/194 |
| 3,293,463 | 12/1966 | Church | 310/71 |
| 3,359,520 | 12/1967 | Foerster | 336/192 |
| 3,646,582 | 2/1972 | Van Alphen | 339/95 D |
| 3,725,707 | 4/1973 | Leimbach | 310/71 |
| 3,760,339 | 9/1973 | Marshall | 310/71 |
| 3,780,323 | 12/1973 | Swain | 310/71 |

*Primary Examiner*—R. Skudy
*Attorney, Agent, or Firm*—William J. Keating; Donald W. Phillion

[57] ABSTRACT

An electric motor assembly in which a one piece connector housing is mounted generally concentrically upon one end of the stack of core laminations, with alignment thereof obtained between the alignment holes in the core laminations and given points on the housing. The housing contains contacts constructed to terminate both the motor field coil ends and lead wires, without solder if desired, and by automated means, if desired.

18 Claims, 10 Drawing Figures

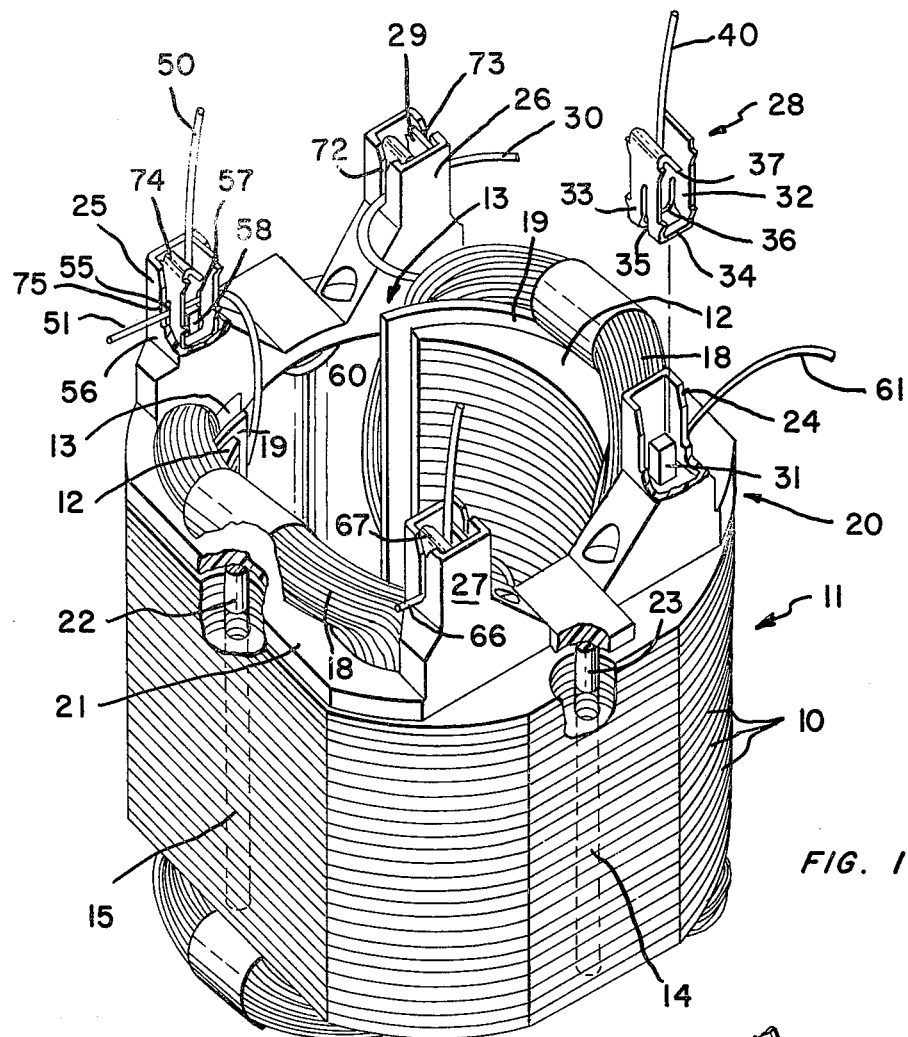
FIG. 1
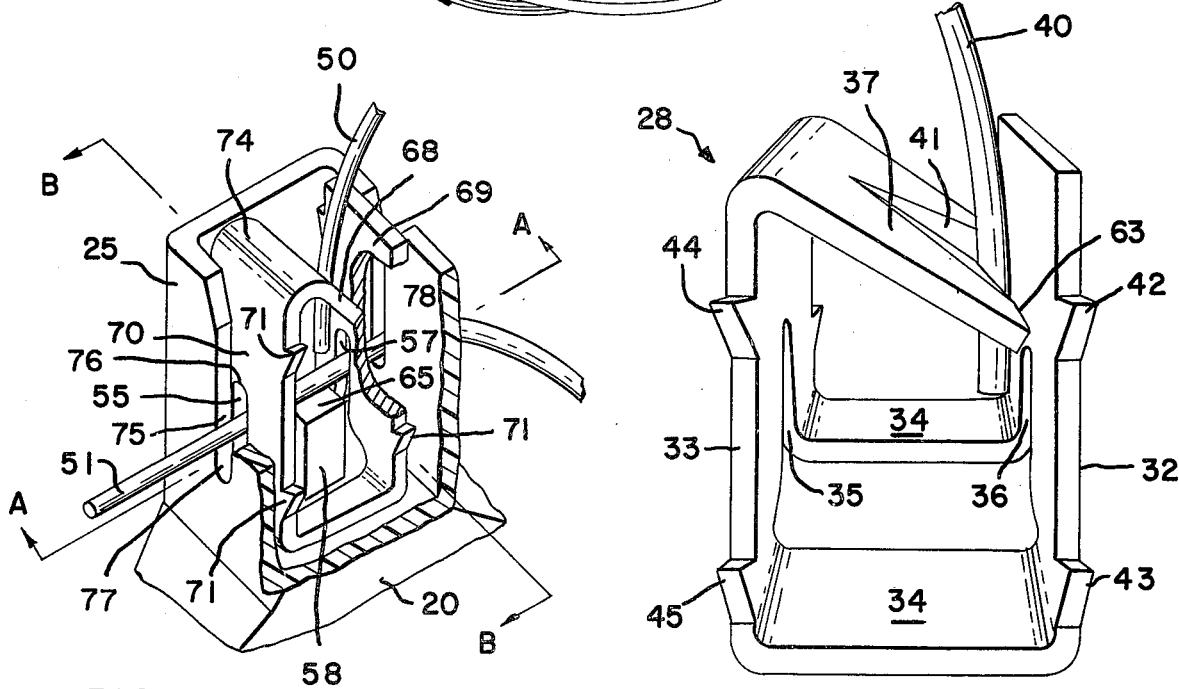
FIG. 3
FIG. 2

SECTION A-A
OF FIG. 3

SECTION B-B
OF FIG. 3

FIELD ASSEMBLY FOR ELECTRIC MOTORS

This invention relates generally to electric motors and more particularly it relates to means and methods for connecting the fine magnet wires of an electric motor field winding to lead wires, frequently stranded, which usually extend to a commutator brush or another core winding.

The afore-mentioned fine magnet wires are coated with a thin insulative material, such as shellac or, more recently, a thin layer of plastic which must be removed before the connection to the lead wire can be made. While it is possible to make the connection between the magnet wire and the lead wire by hand, it is an expensive and time consuming way to make such a connection. Not only must the operator have some means of holding the magnet wire taut so the coil will not become partially unwound, but also must remove the insulation therefrom and then solder or otherwise connect the magnet wire to the lead wire.

It is highly desirable to provide a means for connecting the magnet wire to the lead wire which can be automated and thereby eliminate expensive and time consuming hand operations. Such an automated system or assembly is shown in U.S. Pat. No. 3,725,707 issued Apr. 3, 1973, to Leimbach et al., and entitled "Field Sub-Assembly For Universal Electric Motors." In the afore-mentioned U.S. Pat. No. 3,725,707 a pair of plastic housings are mounted on opposite sides of the stator between the ends of the laminated pole pieces. Each of these two plastic housings have two holes formed therein, into each of which is inserted a terminal having one end thereof formed into a cylindrical portion with an inwardly extending tab. A coil magnet wire is poked down into the cylindrical portion of the terminal and retained therein by the inwardly extending tab. The other end of such terminal is formed into an open barrel which can be crimped around a lead wire placed therein.

The structure of the above-mentioned U.S. Pat. No. 3,725,707 is a commercially feasible structure and adaptable to automation. However, such structure does require two plastic connector housings and a special configuration of the laminations forming the two pole pieces of the stator to provide a space between the ends of said pole pieces which can receive and retain said two connector housings. Furthermore, fairly close tolerance are required between the housings and the ends of the pole pieces in order to provide a friction fit between the housings and the ends of the pole pieces so as to effectively retain said housings therebetween. A further characteristic of the afore-mentioned prior art is the necessity of the crimping operation to secure the ends of the lead wires to the open barrel portions of the terminal which extend out of the holes in the plastic housing.

It is a by-product of the manufacture of pole pieces that a series of alignment holes extending through each of the laminated plates making up the pole pieces exist in the final assembly thereof. These holes are originally formed in each of the laminated sections of the pole pieces to enable alignment of the laminations in the assembly thereof into the final pole piece. In most motors these holes are used for no other purpose. By the nature of their purpose, such holes are in alignment and extend parallel to the axis of the stator of the motor and usually are spaced approximately 90° apart around the laminations.

BRIEF STATEMENT OF THE INVENTION

It is a primary object of the invention to provide a field assembly means utilizing the holes in the core laminations as a means for retaining a connector housing.

It is another principal purpose of the invention to provide a simplified means for terminating the ends of the field coil (magnet wire) of an electric motor in a manner whereby such terminations can be accomplished by automated machinery.

It is a third aim of the invention to provide aa simplified means for connecting the ends of the coil winding of an electric motor to lead-in wires by a connector means which is retained within the holes in the laminated core means and which comprise terminals constructed to receive both the magnet wires and the lead wires to thereby connect them together without the aid of solder and by means of automated installation equipment.

In accordance with one form of the invention there is provided a unitary plastic connector housing having an annular base of generally the same diameter as that of the laminations making up the core of the coil. The said annular plastic bases can have formed thereon at least two pins which are positioned to fit within the alignment holes of said laminated plates to position said annular plastic base substantially concentrically with said laminated plates. The plastic connector housing further comprises at least two contact retaining means each formed integrally therewith and each constructed to retain a contact or terminal element. Said terminal element is constructed to terminate both a magnet wire and a lead wire with automated equipment and without the aid of solder, to thereby connect said lead wire to said magnet wire.

In accordance with a feature of the invention each of said contact retaining means can comprise a box-like element having an open end into which the terminal is inserted, and a pair of slots extending from the open end of said box-like element down the walls thereof and into which slots said magnet wire can be positioned, by automated equipment, if desired, since the position of each box-like element and the slots therein are precisely known.

The contact means can be of many different configurations. One of these configurations which can be employed with the box-like retaining means mentioned above can comprise a plate-like means having a slot formed in a first end of the plate and extending towards the second end of said plate. Each of these terminals is constructed so that the slot means formed therein is in alignment with the slot means in said box-like retaining means and is inserted in said box-like retaining means with the open end of said terminal slot faces the bottom of said box-like retaining means, thereby trapping the magnet wire positioned in the slot of said box-like means between the closed ends of the slot in said box-like retaining means and the slot in the inserted terminal means. The width of the slot in the terminal means is slightly less than the diameter of the magnet wire and thereby removes the insulation from said magnet wire means and makes electrical contact therewith.

In accordance with another feature of the invention the annular plastic base has holes formed therein which coincide with the holes in said core terminations to enable bolting together of said core laminations.

It is to be noted that is not necessary that the annular plastic base be closed upon itself. It is only necessary that the plastic base be unitary and have sufficient length to include both the necessary number of contact retaining means thereon and cover at least two of the holes in the laminations so as to enable proper positioning of said plastic base.

In accordance with still another feature of the invention the plate-like contact means can be generally U-shaped in configuration, consisting of a pair of flat, thin legs and a transverse portion joining together first ends of said two legs to form the U-shaped configuration. The said slot means extends across said transverse element and down into the two legs towards the second ends of said two legs. One of said two legs can be folded over and down into the U-shaped terminal towards the second of said two legs until it is spaced from said second leg a distance less than the diameter of the lead wire. The lead wire can then be inserted in-between the bent-over portion of said first leg and the surface of said second leg to be gripped thereinbetween mechanically and also to establish electrical contact between said lead wire and said magnet wire via the conductive contact means.

BRIEF DESCRIPTION OF THE DRAWINGS

The above-mentioned and other objects and features of the invention will be more fully understood from the following detailed description thereof when read in conjunction with the drawings in which:

FIG. 1 is a perspective view of the field assembly including the core formed of angular laminated elements and including a pair of pole elements field coils wound upon said pole pieces, a plastic connector housing mounted upon said core, and terminals mounted in box-like contact retaining means formed on said connector housing;

FIG. 2 is a single vanishing point perspective view of one of the contacts retained in the connector housing of FIG. 1;

FIG. 3 is a perspective, broken-away view of a terminal which can be employed in the present invention;

DETAILED DESCRIPTION OF THE INVENTION

Figure 4:
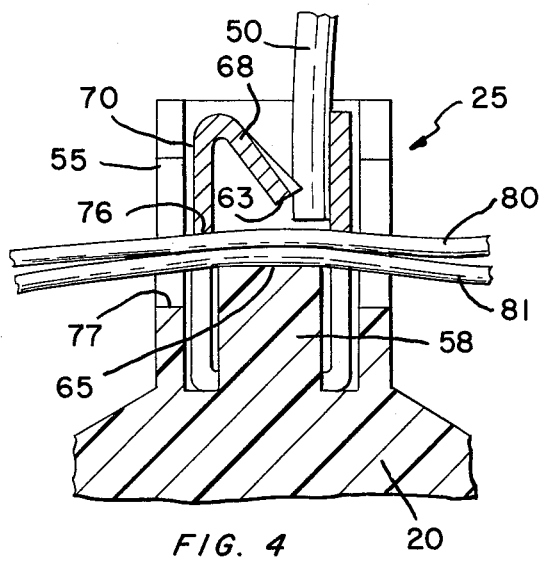
FIG. 4 is a sectional view of the structure of FIG. 3 taken along the plane A—A but with two magnet wires being connected thereto rather than one.

Referring now to FIG. 1 a series of ferrous annular laminations 10 are stacked together to form the iron core 11 of a motor stator. The laminations 10 have a configuration to form the pole pieces 12 with winding slots, such as winding slot 13 formed therein, and around and within which the windings 18 are wound.

A sheet of insulating material 19 is positioned in the winding slots 13 to further insulate the windings 18 from the pole pieces 12, and also from the remainder of the core 11.

In the manufacture of the core 10, holes, such as holes 14 and 15, are formed in each lamination and are utilized to align the laminations 10. Usually there are four such holes 14 and 15 spaced approximately 90° apart around the laminations 10, with each hole extending completely through the entire stack of laminations 10.

Figure 10:
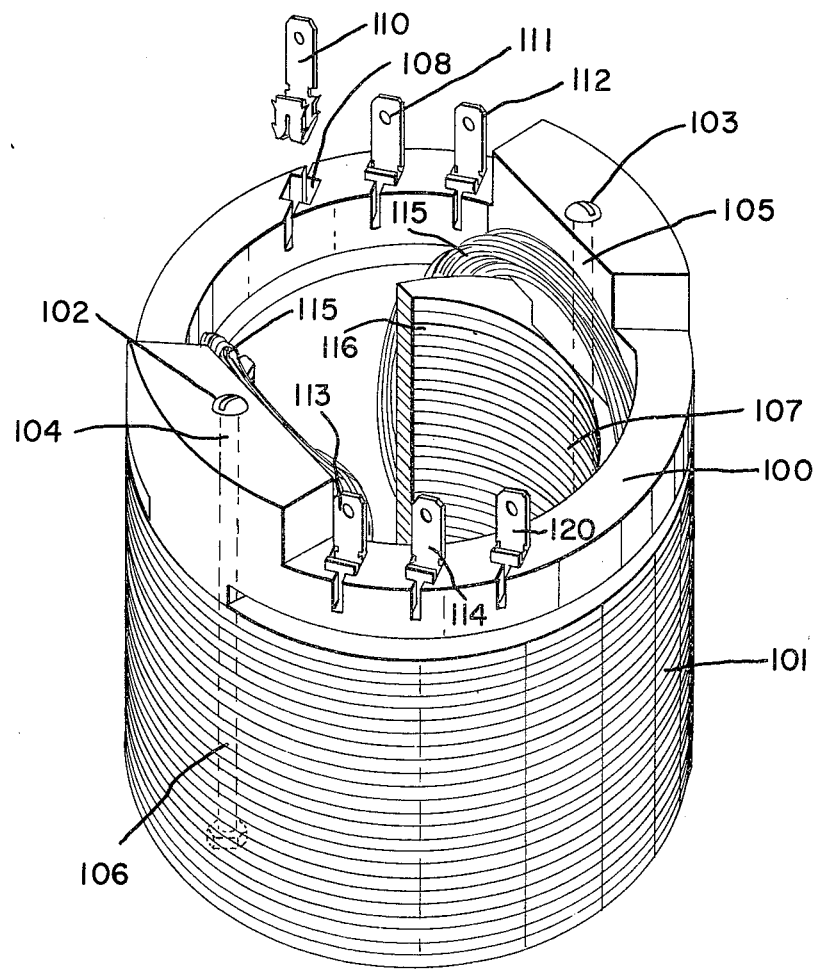
FIG. 10 is a perspective view of another form of the invention.

Since these holes are used primarily for the purpose of aligning the laminations 10, they remain as holes in the finished product and ordinarily no usage is made of them. Sometimes, however, bolts are placed through such lamination holes to further secure the laminations together, as shown in FIG. 10. The afore-mentioned lamination holes, such as holes 14 and 15, are employed in the present invention to retain and align the connector housing, designated generally in FIG. 1 by reference character 20. More specifically, housing 20 has at least two pins, such as pin-like means as appendages 23 and 22, which fit into holes 14 and 15 in laminations 10. Actually, two more pin-like means or appendages similar to pins 23 and 22, can be formed integrally with the annularly-shaped housing 20 to fit into two other holes in the stacked laminations, which holes cannot be seen in FIG. 1. Thus, the single piece housing 20 can be retained on the end of the stack of laminations 10 from one or two to four pins which fit into the lamination holes, such as holes 14 and 15, in such a manner as to align and retain the annular base portion 21 of housing 20 substantially concentrically upon the annular laminations 10.

The windings 18 are then wound around the pole pieces 12 and extend over the plastic housing 20 to firmly retain said housing 20 in place upon the stack of laminations 10.

A plurality of box-like contact retaining elements 24, 25, 26 and 27 are integrally formed upon the annular base 21 of connector housing 20. While four said box-like contact retaining means are shown in FIG. 1, either a greater or a lesser number of such box-like contact retaining means can be formed upon annular base 21, depending upon the number of magnet wires and lead wires required to be terminated in the particular stator being assembled.

The four box-like members 24 through 27 are shown in various stages of manufacture, with members 24 and 25 being partially broken away to show the internal structure thereof, and also to show the relationship between said box-like contact retaining means and the contacts which are inserted therein.

Reference is made first to contact retaining box 24, which has a portion thereof broken away to show a raised plastic portion 31 extending upwardly from the bottom of the box 24. A magnet wire or coil wire end 61 is shown extending from coil winding 18. In final assembly this wire 61 will be laid across the top of raised element 31, as shown for example in the box-like element 25. (An enlarged view of box-like element 25 is shown in FIG. 3 and will be described in detail later herein). Referring again to box-like element 24, the contact which fits therein is shown above the box 24 and designated generally by reference character 28. Such contact element 28 is shown in an enlarged, single vanishing point view in FIG. 2. From both FIGS. 1 and 2 it can be seen that contact element 28 has a generally U-shaped configuration with two main plate-like legs 32 and 33 connected at a first end by a transverse element 34. A slot is formed across said transverse element 34 and extends down into the plate-like legs 32 and 33. Such slots in the plate-like elements 32 and 33 are designated by reference characters 36 and 35.

The second end of plate 33 has an extended portion 37 bent inwardly and down into the "U" towards the inner surface of the other leg 32. The distance between the bent over portion 37 and the inner surface of said other leg 32 is designed to be somewhat less than the diameter of a lead wire 40 which is inserted or poked down in-between said bent over portion 37 and the leg 32.

Referring now to FIG. 2 it can be seen that the bent over portion 37 has a V-shaped portion 41 formed therein which functions to maintin the inserted lead wire 40 centered along the edge 63 of the bent over portion 37. It should further be noted that the strength of the material of contact 28, as well as the spacing between the bent over portion 37 and the inner suface of leg 32, is such that the insulation of the lead wire 40 will be scraped off as wire 40 is inserted. Also a good mechanical grip on the inserted lead 40 will be maintained. Thus, the need for solder between lead 40 and contact 28 is eliminated.

Referring back to FIG. 1, the box-like retaining means 27 shows the contact 67, which has the same configuration as contact 28, inserted therein to trap a magnet wire 66 within the slot 121 of the box element 27 and also the slots (not visible in box 27) of the contact 67. A lead wire 60 is also shown as being retained in the contact 67.

The contact retaining box-like element 26 shows a state of assembly similar to that of box-like element 27 except that no lead wire has been inserted into the contact 29. However, a magnet wire 30 is shown as being inserted into the slots 72 and 73 in contact retaining box-like element 26, and the contact 29 is shown as being inserted within the box-like element 26.

Referring now to the fourth box-like contact retaining element 25 a portion of said element 25 is broken away to show the details of the relationship between the inserted contact 74 and the physical configuration of the interior of the box 25. An expanded, enlarged view of the box-like element 25 of FIG. 1 is shown in FIG. 3 and has the same reference characters. The remaining discussion will be directed to the structure of FIG. 3.

In FIG. 3 the magnet wire 51 rests upon the top surface 65 of the raised element 58, which is a part of the plastic housing 20 (and box 25) and formed integrally therewith. The slots 55 and 57 of contact 74 are aligned with the slots 75 and 122 formed in the opposite walls of box-like element 25. The closed ends 76 and 78 of slots 75 and 122 in contact 74 and the closed ends 77 and 123 in slots 75 and 122 in the walls of box-like retaining element 25 are opposed to each other so that as contact 67 is inserted in box-like element 25 the magnet wire 51 is trapped in-between such closed ends of said slots. The magnet wire 51 is supported upon the surface 65 of wire supporting element 58 so that said magnet wire cannot drop to the bottom of the box-like element 25 and thereby escape from being forced up into the slots 55 and 57 of the contact 74.

At least one of said slots 55 and 57 can have a width slightly narrower than the diameter of magnet wire 51, thereby causing the edges of the slot to scrape away the insulation from the surface of magnet wire 51 to make good electrical and mechanical connection therewith. The width of the slots in the wall of the housing 25, such as slots 75 for example, can be either slightly wider or slightly smaller than the diameter of the magnet wire 51, depending upon the needs of the particular user.

In the manufacturing process a magnet wire 51 is first laid in the slot 75, and if said slot 75 is, in fact, slightly narrower than the magnet wire it will function to retain the magnet wire 51 therein while the contact 74 is being inserted into the box-like retaining element 25.

The four tangs or lances 71 are provided primarily to dig or gouge into the inner sides of the wall of box-like element 25 to securely retain the contact 74 therein. The position of the four lances 71 is important. More specifically, two of the four lances 71 on each leg of contact 67 are located near the open end of the box-like element 25 and the other two legs 71 are located near the bottom of the box-like element 25 and function to force the separated portions of each leg of the contact 74 together. More specifically, for example, leg 70 of contact 74 is divided in two portions by the slot 55 formed therein. The two tangs 71 located near the bottom of the box-like retaining element 25 tend to press these bifurcated portions of leg 70 towards each other to thereby more firmly grip the magnet wire 51 which lies in the slot 55.

Generally, in the manufacture of the assembly shown in FIG. 1 the laminated cores are first assembled in their properly aligned manner, followed by the insertion of the mounting pins 23 and 22 of connector housing 20 in the alignment holes 14 and 15. Next, the insulative linings 19 are inserted in the winding slots 13 followed by the winding of coils 18 in their proper position in the winding slots 13. All of the foregoing steps can be done by automated means.

The next manufacturing step, which also can be done by automated equipment, is to place the four magnet wires 51, 30, 61 and 66 into the slots of the respective contact retaining boxes 25, 26, 24 and 27. Subsequently, also by automated equipment, if desired, the contact elements 74, 29, 28 and 67 are inserted into their respective retaining elements 25, 26, 24 and 27. The next step in the operation is the insertion of lead wires, such as lead wires 50, 40 and 60 into the respective contacts 74, 28 and 67.

It is to be noted that the insertion of the four magnet wires into the slots in their four respective box-like elements can be done simultaneously, by pairs, or individually. Similarly, the contacts 67, 29, 28 and 67 can be inserted singly, in pairs or simultaneously. The same alternative methods of insertion of the lead wires is available, depending upon the construction and capability of the automated equipment available.

Reference is now made to FIG. 4 which shows a sectional view of the structure of FIG. 3 taken along the plane A—A. It is to be noted that FIG. 4 is not a true sectional view of the structure of FIG. 3 since there are two magnet wires 80 and 81 shown in FIG. 4 whereas only one magnet wire is shown in FIG. 3. The showing of two magnet wires 80 and 81 in FIG. 4 merely illustrates that two magnet wires can be terminated with the particular arrangement shown in FIGS. 3 and 4. The remaining elements of FIG. 4, which correspond to elements shown in FIG. 3, are identified by the same reference characters.

Figure 5:
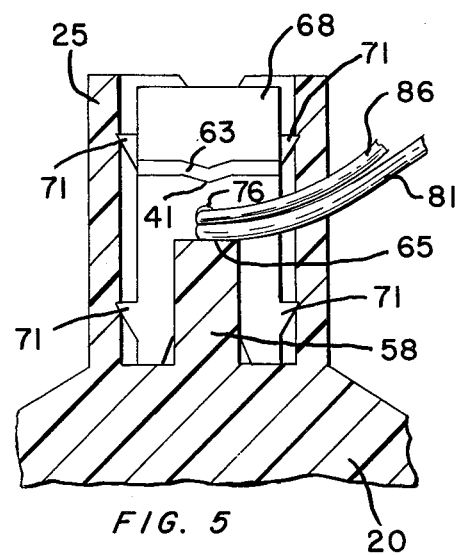
FIG. 5 is a sectional view of the structure of FIG. 3 taken along the plane B—B but also with two magnet wires being connected thereto rather than one.
Figure 6:
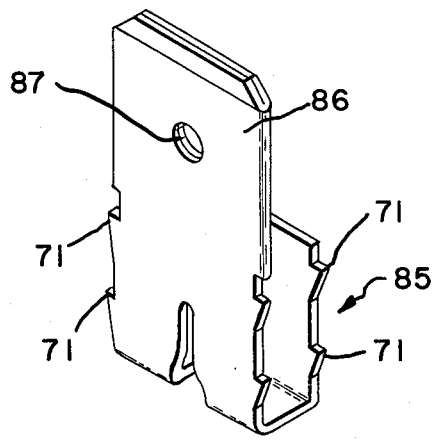
FIGS. 6 through 9 show alternative forms of terminals which can be employed in the invention.

In FIG. 5 there is shown a sectional view of the structure of FIG. 3 taken along the plane B—B and again shows two magnet wires 80 and 81 terminated therein. Also in FIG. 5 it can be seen more clearly how the magnet wires 80 and 81 rest upon the surface 65 of the raised or anvil portion 58 of the box-like housing 25.

FIGS. 6, 7, 8 and 9 show different types of contacts which can be employed in the box-like elements 25, 26

24 and 27 of the structure of FIG. 1. The U-shaped portions 85 of the contacts of FIGS. 6 to 9 are similar to the U-shaped portion of the structure of FIG. 3 and corresponding portions are identified by the same reference characters. For example, the tangs (71) in each of the contacts of FIGS. 6 through 9 are identified by reference character 71, although not all of them are in fact labelled.

Figure 7:
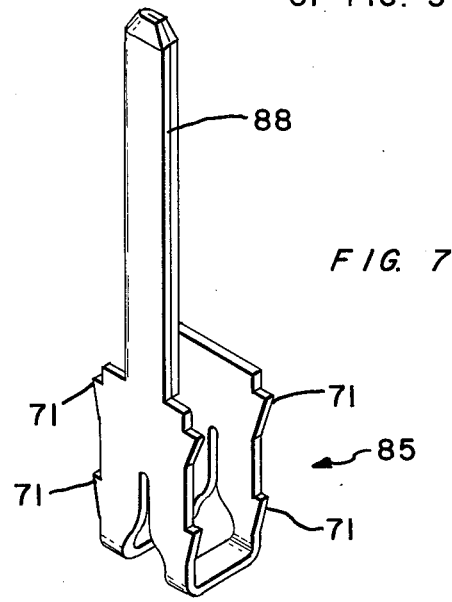

However, the portions of the contacts of FIGS. 6 through 9 to which the lead wires are connected are all different. More specifically, in FIG. 6 the lead wire terminating structure is comprised of a flat element 86 having hole 87 formed therein through which a lead wire (not shown) can be inserted and soldered. In FIG. 7 a lead wire (not shown) can be wound around a post 88 by suitable wire wrap or clip means.

Figure 8:
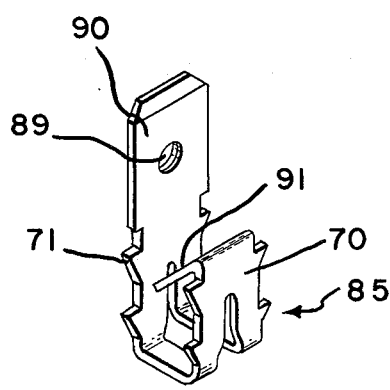

In FIG. 8 a lead wire can be inserted through the hole 89 in the flat section 90. A second lead wire can be inserted between bent over portion 91 of the leg 70 and the inside surface of the opposite leg 90. It is to be noted that in both FIGS. 6 and 8 the flat portions 86 and 90, respectively, can be terminated in a female receptacle rather than have a lead wire secured through the holes provided therein.

Figure 9:
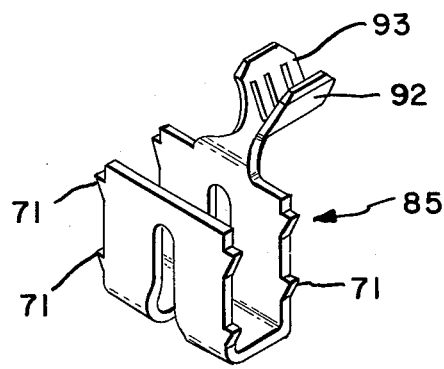

In FIG. 9 the lead wire can be terminated in a crimpable barrel 92 having serrations 93 therein.

Referring now to FIG. 10 there is shown an alternative form of the invention in which an annular plastic housing 100 is mounted on the top of a stack of laminations 101. Bolts 102 and 103 extend through hole 104 and 105 provided therefore in the plastic housing 100 and then down through the holes 106 and 107 provided in the laminations of core 101.

Box-like contact retaining means or receptacles, such as receptacle 108 of FIG. 10, have an internal structure similar to that of FIG. 3. Any one of the contacts of FIGS. 3, 6, 7, 8 or 9 can be inserted in the box-like contacting retaining means 108. The particular contact 110 shown employed in the structure of FIG. 10 is similar to that shown in FIG. 6. Contacts 111, 112, 113, 114 and 115, all of which are similar to contact 110 within contact retaining means similar to 108. In FIG. 10 the stator windings 115 are wound around yokes 116.

While much of the above discussion has been directed towards the use of a box-like contact retaining means and a terminal having a U-shaped portion which fits into said box-like retaining means, it is to be understood that many different types of contact holding means can be employed in this invention and can be secured upon the unitary annular base which is secured and aligned to the laminated core by means of alignment holes in said core.

It is to be understood that the forms of the invention shown and described herein are but preferred embodiments thereof and that various changes can be made therein without departing from the spirit or scope of the invention.

We claim:

1. An assembly comprising an iron core formed of a stack of annular laminations each having at least two lamination alignment holes therein and at least one coil wound thereon with at least one coil wire end, and connector means constructed to connect said coil ends to external conductors with said connector means comprising:
 a unitary, insulative housing comprising a base having a shape similar to at least a portion of the annular laminations of said iron core and mounted concentrically upon one end of said stack of laminations, and extending around said one end at least the angular distance between adjacent lamination alignment holes;
 at least one contact means;
 said insulative housing further comprising at least one contact retaining means constructed to retain one of said contact means; and
 appendages on said housing base for securing said housing base to said at least two lamination alignment holes in said laminations and to align said housing with respect to said iron core;
 each of said contact means constructed to secure and make electrical contact with at least one coil end and at least one external conductor.

2. An assembly as in claim 1 in which said appendages fit within said lamination alignment holes to maintain said housing base in substantially concentric alignment with said stack of annular laminations.

3. An assembly as in claim 1 in which:
 said housing base has holes formed thereon to coincide with said lamination alignment holes; and
 comprising bolt means passing through said alignment holes and said coinciding holes in said housing base to align and secure said housing base on said laminations.

4. An electric motor field assembly comprising a stator core formed of a stack of annular laminations each having at least two lamination alignment holes therein and at least one coil wound thereon with at least one coil wire end, and connector means constructed to terminate said coil ends, with said connector means comprising:
 an insulative housing comprising a base having a shape similar to at least a portion of the annular laminations of said core and mounted concentrically upon one end of said stack of laminations and extending around said one end at least the angular distance between lamination alignment holes;
 at least one contact means;
 said insulative housing further comprising at least one contact retaining means constructed to retain one of said contact means; and
 appendage means formed on said housing base for securing said housing base to said at least two lamination alignment holes in said laminations and to align said housing with respect to said stator core;
 each of said contact means constructed to secure and make electrical contact with at least one coil wire end.

5. A motor assembly in claim 4 in which said appendage means fit within said lamination alignment holes and maintain said housing base in substantially concentric alignment with said stack of annular laminations.

6. A motor assembly as in claim 4 in which:
 said housing base has holes formed thereon to coincide with said lamination alignment holes; and
 comprising bolt means passing through said alignment holes and said coinciding holes in said housing base to align and secure said housing base on said laminations.

7. A motor assembly comprising a stator core comprised of a stack of annular laminations and at least one coil wound therein, each having at least one coil wire end, a plurality of external conductors and connector means for terminating said coil wire ends, with said connector means comprising:

an insulative housing comprising a base having a shape similar to at least a portion of the annular laminations of said core and mounted substantially concentrically upon, and extending at least 180° around, one end of said stack of laminations;

at least one contact means;

said insulative element further comprising at least one box-like contact retaining means defined by walls integrally and vertically mounted upon said base;

each of said box-like retaining means open on one side and having first slot means with an open end and a closed end and extended down one wall from said open side and said towards said base;

one of said contact means inserted in each of said box-like elements and comprising plate-like means;

said plate-like means further comprising second slot means having an open end and a closed end with its open end facing away from the open side of said box-like element;

the first slot means of each box-like element and the second slot means of the plate-like means inserted therein being aligned to trap the coil wire end positioned within said first slot means between the closed ends of said first and second slot means; and each of said contacts further comprising a portion for retaining one of said external conductors.

8. A motor assembly as in claim 7 in which said first slot means of each of said box-like contact retaining elements further comprises:

a second slot having an open end and a closed end and extending down a second wall from said open side towards said base; and in which said first and second slot means are aligned with the said second slot means in said plate-like means inserted therein.

9. A motor assembly as in claim 8 in which plate-like means comprises:

a U-shaped element having thin, wide first and second legs, and a transverse element joining together first ends of first and second legs;

in which said second slot means comprises a third slot extending across said transverse element and down into both said first and second legs of said U-shaped element; and in which said first and second slot means of said box-like contact retaining element are in alignment with said third slot of said U-shaped element.

10. An assembly as in claim 9 in which each of said box-like retaining means comprises a portion raised from the bottom surface of said retaining means and which has a top surface positioned between the slots of said box-like retaining means to support said coil wire end.

11. An assembly comprising a core comprised of a stack of annular laminations having at least two lamination alignment holes therein and at least one coil wound therein, each coil having at least one coil end, and connector means for terminating said coil ends and comprising:

an insulative housing comprising a base having a shape similar to at least a portion of said annular laminations and mounted substantially concentrically upon one end of said stack of laminations;

said insulative housing further comprising at least one box-like element defined by walls integrally and vertically mounted upon said base;

appendage means positioned on said base to fit within said lamination alignment holes for securing said base upon said stack of laminations in a substantially concentric manner;

each box-like element being open on one side and having first slot means with an open end and a closed end and extending down one wall from said open side thereof and towards said base;

contact means inserted in each of said box-like elements and comprising plate-like means;

said plate-like means further comprising second slot means having an open end and a closed end with its open end facing away from the open side of said box-like element;

the first slot means of each box-like element and the second slot means of the plate-like means inserted therein being aligned to trap the wire positioned within said first slot means between the closed ends of said first and second slot means.

12. A motor assembly as in claim 11 in which said first slot means of each of said box-like elements further comprises:

a second slot having an open end and a closed end and extending down a second wall from said open side towards said base; and in which said first and second slot means are aligned with the said second slot means in said plate-like means inserted therein.

13. A motor assembly as in claim 12 in which said plate-like element comprises:

a U-shaped element having thin, wide first and second legs, and a transverse element joining first ends of first and second legs;

in which said second slot means comprises a third slot extending across said transverse element and down into both said first and second legs of said U-shaped element; and in which said first and second slot means of said box-like contact retaining element are in alignment with the portions of said third slot of said U-shaped element extending down into said first and second legs.

14. An assembly as in claim 13 in which each of said box-like elements comprises a portion raised from the bottom surface of said retaining means and which has a top surface positioned between the slots of said box-like elements to support said coil wire end.

15. A motor assembly comprising a stack of annular core laminations each having at least two alignment holes and at least one coil wound thereon and having at least one coil end, a plurality of external conductors and connector means for connecting said coil ends to said external conductors and comprising:

an insulative, annular base shaped similarly to the annular laminations of said core and mounted substantially concentrically upon end of said stack of laminations and having first and second appendages secured to said two alignment holes in said laminations;

said insulative element further comprising a plurality of contact retaining cavities defined by walls integrally formed with, and vertically mounted upon, said annular base;

each of said contact retaining cavities being open on a side away from said base and having a first slot means comprising a first slot with an open end and a closed end and extending down a first wall from said open side towards said base;

at least one coil end positioned in each of said first slot means;

a contact means comprising plate-like means inserted in each of said contact retaining cavities;

each of said plate-like means comprising second slot means having a closed end and an open end with said open end opening towards said annular base;

the first slot means of each cavity and the second slot means of the plate-like means inserted therein being aligned with each other to trap the wire positioned within said first slot means between the closed ends of said first and second slot means; and each of said contacts further comprising a wire retaining means for retaining at least one end of said external conductors.

16. A motor assembly as in claim 15 in which said appendages fit within said lamination alignment holes to maintain said annular base in substantially concentric alignment with said stack of annular laminations.

17. A motor assembly as in claim 16 in which:
said housing base has holes formed thereon to coincide with said lamination alignment holes; and
comprising bolt means passing through said alignment holes and said coinciding holes in said housing base to align and secure said housing base on said laminations.

18. An assembly as in claim 17 in which each of said retaining cavities comprises a portion raised from the bottom surface thereof and which has a top surface positioned between the slots of said box-like retaining means to support said coil wire end.

* * * * *

UNITED STATES PATENT OFFICE
CERTIFICATE OF CORRECTION

PATENT NO. : 3,979,615
DATED : September 7, 1976
INVENTOR(S) : NELSON EDWARD NEFF It is certified that error appears in the above-identified patent and that said Letters Patent are hereby corrected as shown below:

Column 8, line 40, before "lamination" insert

- - - adjacent - - - ;

Column 8, line 52, before "in claim 4" insert

- - - as - - - .

Column 9, line 14, before "down one" delete "extended"

and insert - - - extending - - - ;

Column 9, line 15, before "towards said" delete "said";

Column 9, line 38, before "plate-like" insert

- - - said - - - .

Column 10, line 56, before "end of" insert - - - one - - - .

Signed and Sealed this

Seventh Day of December 1976

[SEAL]

Attest:

RUTH C. MASON
*Attesting Officer*

C. MARSHALL DANN
*Commissioner of Patents and Trademarks*